(12) United States Patent
Worley et al.

(10) Patent No.: US 9,536,339 B1
(45) Date of Patent: Jan. 3, 2017

(54) PROCESSING UNORDERED POINT CLOUD

(71) Applicant: AMAZON TECHNOLOGIES, INC., Reno, NV (US)

(72) Inventors: Connor Spencer Blue Worley, San Diego, CA (US); Devin Bertrum Pauley, Mountain View, CA (US)

(73) Assignee: Amazon Technologies, Inc., Reno, NV (US)

( * ) Notice: Subject to any disclaimer, the term of this patent is extended or adjusted under 35 U.S.C. 154(b) by 465 days.

(21) Appl. No.: 13/916,639

(22) Filed: Jun. 13, 2013

(51) Int. Cl.
*G06T 15/00* (2011.01)

(52) U.S. Cl.
CPC ..................... *G06T 15/00* (2013.01)

(58) Field of Classification Search
CPC ........................................... G06T 15/00
See application file for complete search history.

(56) References Cited

U.S. PATENT DOCUMENTS

| | | | |
|---|---|---|---|
| 2010/0141666 A1* | 6/2010 | Christopher | G06T 13/20 345/520 |
| 2012/0078894 A1* | 3/2012 | Jiang | G06F 17/30743 707/723 |
| 2012/0184840 A1* | 7/2012 | Najarian | G06K 9/629 600/408 |
| 2012/0194516 A1* | 8/2012 | Newcombe | G06T 17/00 345/420 |
| 2013/0076865 A1* | 3/2013 | Tateno | G01B 11/03 382/154 |
| 2013/0236089 A1* | 9/2013 | Litvak | G06K 9/00382 382/154 |

* cited by examiner

*Primary Examiner* — Michelle Chin
(74) *Attorney, Agent, or Firm* — Lindauer Law, PLLC

(57) ABSTRACT

Described are methods and systems of processing three-dimensional ("3D") data by generating an edge map, a depth map, or both. Data points are placed into a bin array based their respective image coordinates. The data points in each bin are processed to determine edge data. An edge map may be generated from this edge data. A bin value may be generated based on the data points in each bin, and a depth map generated using these bin values. The edge data and the edge map may be processed using one or more filter functions. Measurements based on the edge map may be provided at a resolution greater than that available with the depth map.

20 Claims, 10 Drawing Sheets

Edge Characterization Data
202

| Edge Identifier 204 | Edge Shape 206 | Edge Coordinates 208 |
|---|---|---|
| 204(1) | | (1,2) |
| 204(2) | | (2,2) |
| 204(3) | | (3,3) |
| 204(4) | | (1,1) |
| 204(5) | | (2,2) |
| 204(6) | | (2,2) |
| 204(7) | | (2,2) |

FIG. 2

PROCESSING UNORDERED POINT CLOUD

BACKGROUND

Three-dimensional ("3D") scans of actual objects may result in generation of large sets of data. These large sets of data may be processed in various ways to identify the actual object, determine one or more dimensions or measurements of the actual object, and so forth. The processing may be computationally complex to execute, particularly on devices with limited computing resources, such as portable computing devices.

BRIEF DESCRIPTION OF DRAWINGS

FIG. 2 is a block diagram of edge characterization data which may be used to form the edge map.

Figure 1:
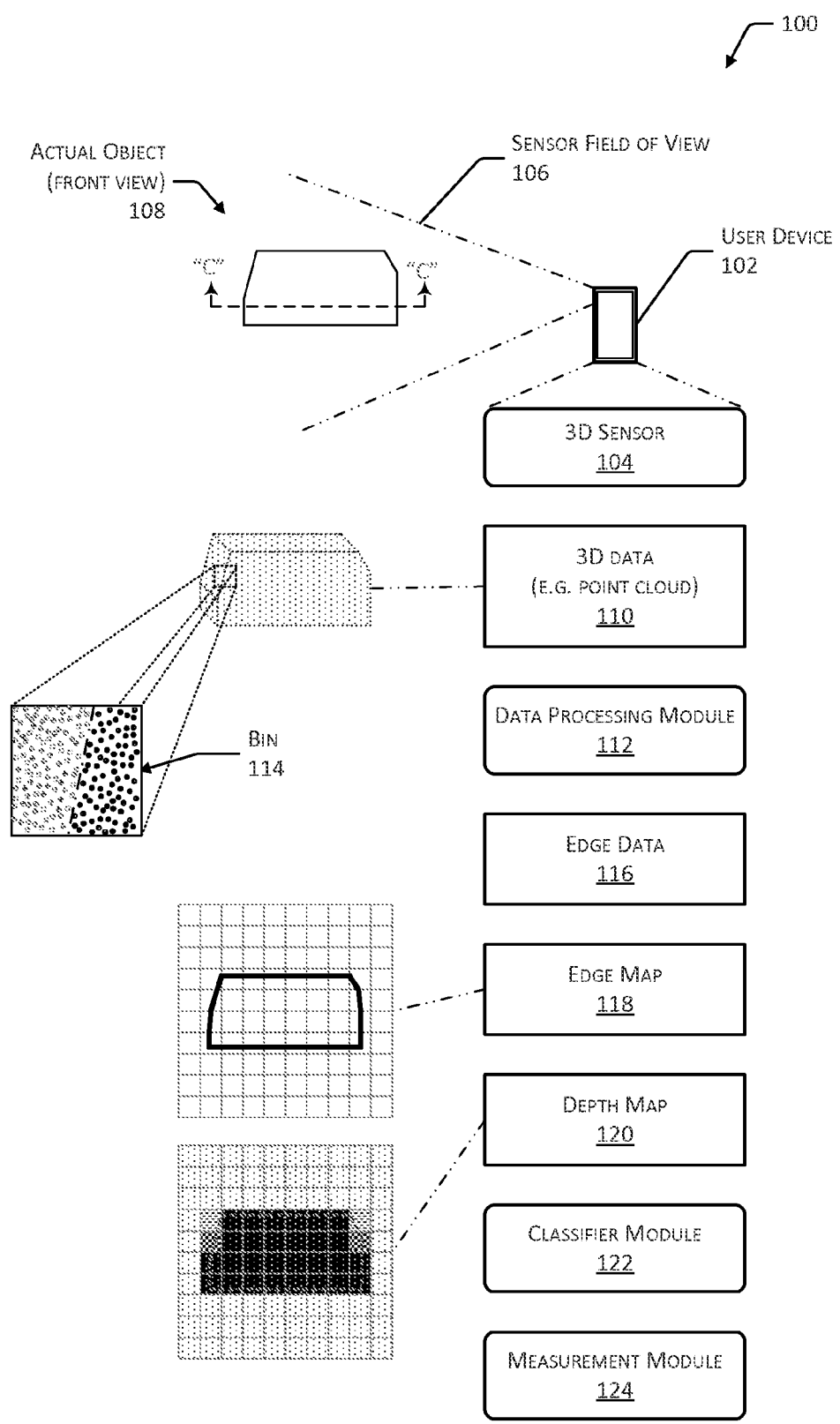
FIG. 1 is an illustrative system for processing point cloud data representative of a three-dimensional ("3D") object to determine an edge map, a depth map, or both.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Three-dimensional ("3D") sensors may gather 3D data about actual objects in the real world. These actual objects may be items available for sale, things in the environment, a user or a part thereof, and so forth. For example, a 3D sensor may be used to generate data about a ring which is for sale to allow for virtual "fit" testing, or about the user's finger to see if the virtual ring will fit.

This 3D data may be described as a point cloud. The point cloud may be visualized as a grouping of data points, with each point at a different location on a surface of the actual object. Each data point may have a set of coordinates. Other data may also be included in the data points, such as color, reflectance, and so forth.

In one implementation these coordinates may designate a position within a Cartesian space having three mutually orthogonal axes, such as X, Y, and Z. In this Cartesian space, the coordinates may be expressed as (X,Y,Z). The coordinates may be image coordinates with a distance value, such as a particular pixel as designated by X and Y coordinates of an imaging sensor in the 3D sensor and the corresponding distance to the object represented by that pixel. In other implementations, other coordinate systems may be used.

The point cloud may be provided in an ordered form or an unordered form. Ordered point cloud data includes some sort of relationship between the points. For example, ordered point cloud data may include a vector from one point to another, or may be expressed as a linked list of points. In some implementations the ordered point cloud data may be uniform in spatial distribution, such as in a regular gridded two- or three-dimensional array.

In comparison, the unordered point cloud data may have data points in which information about relationships between the points is not known or stored. Furthermore, unordered point cloud data may not be uniform in spatial distribution. For example, the unordered point cloud data provided by the 3D sensor may have data points which do not readily fit within a regular gridded two- or three-dimensional array.

It may be desirable to use one or more processing techniques, such as filtering, to analyze the unordered data points. However, due to the potential non-uniformity of unordered data points, these filters may not be readily applied to unordered data points. Furthermore, previous techniques to manipulate the unordered data points may result in lost resolution, in effect lowering the resolution of information obtained about the actual object to less than that which the 3D sensors are capable of reliably determining. As a result, determination of small details or accurate measurements may be lost or become imprecise.

Described in this disclosure are methods for generating from an unordered point cloud an edge map which preserves edge information. The edge map describes one or more edges present on the actual object. For example, the edge map may be visualized as an outline of the object. The edge information describes a position of one or more portions of the edge of the actual object in space. This edge map may then be used for high-resolution determination of distances between points on the edges, sizes of objects, and so forth. Use of the edge map requires fewer computational resources compared to previous techniques which call for accessing and processing the point cloud data.

The unordered point cloud comprising many data points is accessed. The data points are placed or arranged into a plurality of bins arranged in a bin array. The placement is based at least in part on the image coordinates in the data point. In other implementations placement may be based on other factors, such as distance between a point designated by the image coordinate and an origin.

The bin array may be visualized as many bins arranged in a two-dimensional grid of rows and columns. Inside each bin of the array are the various data points which have been placed there. The plurality of data points may then be processed to determine one or more edges which are present within the bin. In one implementation the edges may be determined by looking for variances in depth or distance which exceed a predetermine edge threshold. For example, an edge may be determined where two points described by two data points within 0.5 millimeters of one another in the X,Y plane exhibit a difference along the Z axis of greater than 2 millimeters.

For at least a portion of the bins, edge data may be generated based on the one or more determined edges. The edge data characterizes the one or more edge segments in the bin. In one implementation the edge data may comprise a reference to an entry in a previously defined table of edge characterization data containing different shapes of edges, different relative positions of the edges within the bin, and so forth. In another implementation the edge data may comprise a linked list connecting several of the points represented by the data point to form the edge segment.

From the edge data in one or more of the bins in the bin array, an edge map may be generated. For example, the edge segments which are described by the edge data in the various bins may be joined together to form the edge map of the object. In some implementations, such as where the edge segment is characterized by referencing the edge characterization data, the smoothed edge assembled from the edge segments as characterized may differ slightly from the actual edge of the actual object. The edge map may be generated by applying a smoothing or connection function to the edge data to join or shift the edge segments in adjacent bins to form a continuous edge.

The edge map may be used to determine various things about the actual object which it represents. The edge information, now two-dimensional ("2D") data, may be readily processed using existing filters. Furthermore, because of the 2D nature of the edge map, this processing may be readily done using minimal resources. For example, the constrained resource environment of a portable user device, having relatively limited processor capability and memory present as compared to a server, may apply these 2D filters to the edge map. The edge map may be used for blob detection, region of interested definition, and so forth. Because the detailed position of the edge segments within the bins has been preserved, the edge map provides highly accurate dimensional information about an object. For example, the edge map may be used to provide a high-resolution measurement of an object, such as a user's finger. In comparison, conventional techniques may rely on accessing and processing the raw point cloud data. This processing is resource intensive, and may not be available on device with limited resources, such as a portable user device.

With the data point binned, and the edge map generated, the data points may be processed to determine a bin value indicative of depth or distance of the data points, such as an average distance. In other implementations other functions may be applied to the data points within the bin to determine a bin value. A depth map may then be generated from these bin values, with each bin being a pixel in the resulting depth map and the "color" or value of the pixel being the bin value. With the depth map now expressed as a 2D array, the 2D filters may be readily applied to facilitate various functions such as blob detection, object identification, and so forth.

Information about the actual object may be readily determined using the edge map, the depth map, or both in combination. Because details about the edges in the bins have been preserved, the edge map provides high-resolution which is readily queried. Compared to conventional systems which may rely on accessing the point cloud data to determine distances between two points or more points, using the techniques described herein, the edge map may be used to determine the distances. This reduces computational and storage requirements, may result in a faster response time to the user, and may result in an improved user experience.

Illustrative System

FIG. 1 is an illustrative system 100 for processing point cloud data representative of a three-dimensional ("3D") object to determine an edge map, a depth map, or both. A user device 102 is depicted. The user device 102 may comprise a tablet computer, personal computer, electronic book reader, television, in-vehicle entertainment system, gaming console, smartphone, wearable computing device, and so forth. In some implementations, the system 100 may include a server or other device which may implement at least a portion of the functions described below.

The user device 102 may include a three-dimensional ("3D") sensor 104. The 3D sensor 104 may have a sensor field of view 106. One or more actual objects 108 within this sensor field of view 106 may be analyzed and 3D data 110 about the one or more actual objects 108 may be stored by the user device 102. The 3D data 110 may comprise an unordered point cloud. The unordered point cloud may comprise data points in which information about relationships between the points is not known or stored, which do not have a uniform spatial distribution, and so forth. For example, the data points provided by the 3D sensor 104 may not readily fit within a regular gridded two- or three-dimensional array. In another example, information about different points which are physically separated on the actual object 108 may be adjacent to one another in a data structure, such as a table of the data points.

The 3D sensor 104 may include one or more devices, such as: an optical time-of-flight sensor comprising an emitter and a detector camera; a structured light sensor comprising a structured light emitter and a camera; a stereovision sensor comprising a plurality of cameras; an interferometer comprising a coherent light source and a detector; or a coded aperture camera having a coded aperture. In other implementations, other devices configured to generate 3D data may be used. The 3D sensor 104 may be configured to provide 3D data with a resolution of less than one millimeter ("mm"). In other implementations higher or lower resolutions may be used.

The 3D data 110 comprises a point cloud having a plurality of data points. The data points may comprise one or more image coordinates and a distance or depth value. In one implementation the image coordinates may designate a position on a sensor as described as a Cartesian space having mutually orthogonal axes, such as X and Y. In other implementations, other coordinate systems may be used, such as a spherical coordinate system. Furthermore, other data may be included in the data point, such as color, reflectance, and so forth. In some implementations the coordinates may express an actual position within three-dimensional space.

In the Cartesian space, the coordinates may be expressed as (X,Y,Z). The X and Y axes may be designated by a relative or absolute position. A relative position is not necessarily tied to a real-world measurement such as meters or inches or latitude and longitude. For example, a relative position may be expressed as a particular row or column of a pixel on an imaging sensor. In this example, the image coordinate designates a relative location within a planar sensor field of view 106.

In comparison, an absolute position corresponds to an established datum in the real-world, such as point A is located at geographic coordinates N 97.12203 W 30.11923 and point B is located at geographic coordinates N 97.12209 W 30.11920. The Z axis coordinate may be expressed with a distance unit of measure as a distance between the point being measured and the 3D sensor 104, a designated origin point in space, and so forth.

A data processing module 112 of the user device 102 is configured to process at least a portion of the 3D data 110. For example, the data processing module 112 may be configured to arrange the data points into a plurality of bins 114. The plurality of bins 114 may be arranged in an array, such as a two-dimensional array of rows and columns.

The data processing module 112 may be configured to provide edge detection functions using the data points in the one or more of the bins 114. The edge detection functions may be configured to determine an edge segment which extends along a boundary between a first set of one or more data points and a second set of one or more data points. The edge segment is indicative of the transition between the first set and the second set.

In one implementation edge data 116 may be generated by associating the edge segment detected in the bin 114 with a previously characterized edge. The edge data 116 may comprise an index referring to one or more different edge shapes, edge positions with the bin 114, and so forth. The edge data 116 may comprise a reference such as the index, which is used to refer to a particular characterized edge as described in edge characterization data. For example, rather than the edge data 116 including a detailed set of points describing a vertical edge, the edge data 116 may refer to an edge identifier "2" stored in an edge characterization data table. The edge characterization data is described in more detail below with regard to FIG. 2. The process of determining the edge data 116 using the edge characterization data is described below in more detail with regard to FIG. 8.

In another implementation, the edge data 116 may comprise a linked list or other data structure comprising one or more line segments connecting a plurality of points. For example, the data points in the bin 114 which correspond to an edge may be joined to form the edge segment which is indicative of the edge. The process of determining the edge data 116 in this fashion is described below in more detail with regard to FIGS. 3 and 9.

The data processing module 112 may use the edge data 116 to generate an edge map 118. The edge data 116 for a plurality of the bins 114 in the bin array are used to assemble the edge map 118. For example, the edge segments which are described by the edge data 116 in the various bins 114 may be joined together to form the edge map 118 of the actual object 108. Generation of the edge map 118 is described below in more detail with regard to FIGS. 4 and 10.

The data processing module 112 may also process the data points within the one or more bins 114 to determine a bin value. In one implementation the bin value may comprise an average of the Z data within the bin 114. The bin values may then be used to generate a depth map 120. The depth map 120 comprises a two-dimensional array containing Z data such as distance, height, and so forth. In some implementations each bin 114 may correspond to a pixel in the depth map 120.

A classifier module 122 may be used to process the edge map 118, the depth map 120, or both using one or more filters or other functions. For example, the classifier module 122 may be configured to apply a Haar basis filter function to the depth map 120, or apply a region of interest identification function to the edge map 118.

The user device 102 may also include a measurement module 124. The measurement module is configured to use the edge map 118, the depth map 120, or a combination thereof, to determine distances between two or more points, length of at least a portion of an edge of the actual object 108, and so forth. Once determined, this distance may be stored for use by other modules, transmission to another device, and so forth. As described above, the measurement module 124 is able to make these measurements without referring to the 3D data 110.

FIG. 2 is a block diagram 200 of edge characterization data 202 which may be used to form the edge map 118. The data points within the bin 114 may be processed to determine one or more edges. Rather than store a detailed description of the edge as detected, the edge may be characterized as one of a predetermined set of edges represented in the edge characterization data 202. Using this technique, an index or reference to a particular edge in the edge characterization data 202 may be stored, rather than the detailed description.

In this illustration, the edge characterization data 202 includes an edge identifier 204. The edge identifier 204 provides a unique referent with which to refer to a particular combination of one or more of edge shape 206, edge coordinates 208, edge rotation, and so forth. The edge shape 206 provides information indicative of particular shape of the edge. For example, a straight line, a particular curve, an angled line, and so forth. The edge coordinates 208 provide information about the position of the edge shape 206, relative to the bin 114. While edge coordinates 208 are described in this illustration, in other implementations other coordinates associated with the edge shape 206 may be used. For example, a start point and an end point of the edge shape 206 may be specified.

As shown here, the edge identifier 204(1) corresponds to an edge shape 206 of a vertical edge, having edge coordinates 208 of (1,2) within the bin 114. In comparison, the edge identifier 204(2) has the same edge shape 206 of a vertical edge, but has edge coordinates 208 of (2,2). Furthermore, in some situations the bin 114 may contain no detectable edge, such as indicated by the edge identifier 204(7).

By determining an edge identifier 204 for each of the bins 114, and using the known placement of the bins 114 relative to one another, the data processing module 112 may generate the edge map 118. In some situations, discontinuities may exist between the edge shapes 206 identified in adjacent bins 114. In these situations, a smoothing or joining function may be used to generate a smoothed edge map 118 which provides for a continuous edge defining a closed shape.

A manual process, an automated process, or a combination thereof may generate the edge characterization data 202. For example, the data processing module 112 may be configured to process a library of previously stored 3D data 110 to determine representative edge shapes 206 which occur with a frequency above a threshold value.

The edge characterization data 202 and the resulting edge map 118 maintains a high fidelity relative to the actual object 108 by retaining at least a close approximation of the actual location of the edge within the bin 114. As a result, the measurement module 124 is able to access the edge map 118 and determine information such as a distance between two or more points with a greater degree of accuracy than available in the depth map 120, and without the computational overhead associated with accessing the 3D data 110.

The edge characterization data 202 is illustrated here as a table. However in other implementations the information may be stored using other data structures. For example, the edge characterization data 202 may be stored as an extensible markup language ("XML") file.

Figure 3:
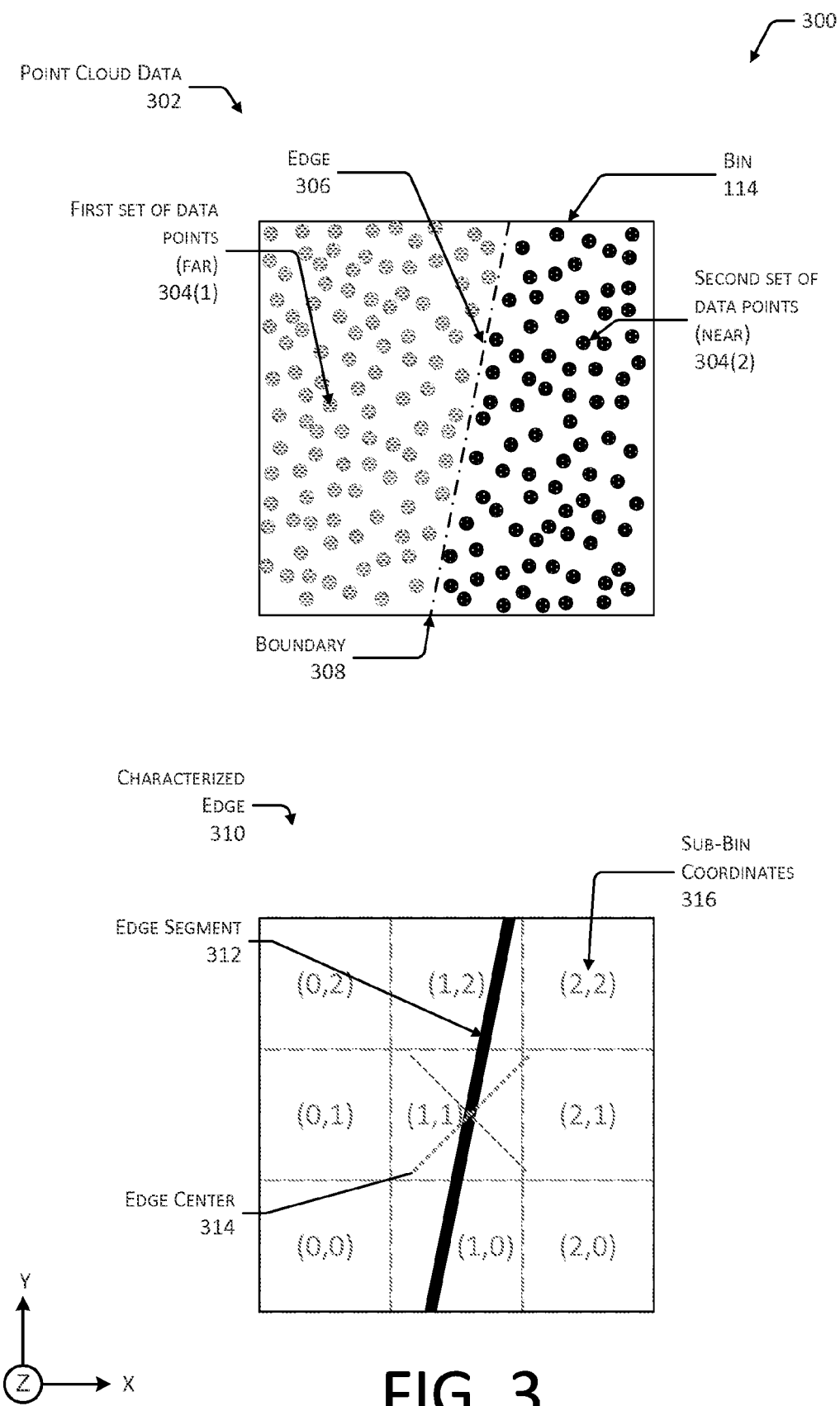
FIG. 3 illustrates data points in a bin and a characterized edge represented by data points within that bin.

FIG. 3 illustrates characterization 300 of an edge. Point cloud data 302 for a particular bin 114 is depicted here. A first set of data points 304(1) is shown as well as a second set of data points 304(2). The first set of data points 304(1) in this illustration comprise data points indicative of points having a Z value which places them relatively far away, compared to the second set of data points 304(2). For example, an edge threshold may be used to determine which points are included in the first set or the second set.

Between the first set of data points 304(1) and the second set of data points 304(2) extends an edge 306 along a boundary 308. The boundary 308 comprises a region between the sets. This edge 306 may be determined by the data processing module 112, based on the boundary 308 between the first set of data points 304(1) and the second set of data points 304(2). For example, a rapid transition in Z value which exceeds an edge threshold may result in determination of an edge 306, and the shape and position of the edge 306.

As described above, a characterized edge 310 may be determined. An edge segment 312 is generated based on the data indicative of the edge 306. The edge segment 312 may include one or more line segments. For example, as illustrated here the edge segment 112 comprises a line oriented at a diagonal relative to vertical on the page. An edge center 314 may be determined. The edge center 314 may be based using a midpoint function, vector functions, and so forth.

Positions within the bin 114 may be specified using sub-bin coordinates 316. For example, as illustrated here the sub-bin coordinates 316 are described using a 3×3 array, with an origin at a bottom left corner. Continuing the example, the edge segment 312 depicted here has an edge center 314 which is located within the rectangle designated at sub-bin coordinates (1,1). By information about the placement of the edge segment 312 within the bin 114, spatial information about the edge 306 is preserved, retaining a high-accuracy representation of the edge 306. In other implementations, the sub-bin coordinates 316 may have a finer resolution (such as 10×10) or coarser resolution (such as 2×2).

While a single edge 306 is depicted, it is understood that these techniques may be used to determine a plurality of edges 306 within the same bin 114. For example, where the actual object 108 has a crenelated profile, or a series of ridges, those edges 306 may also be described.

In another implementation, the edge 306 may be defined with edge data 116 comprising a linked list of a series of the points in the data points 304, as a vector entity, and so forth. For example, the edge 306 in the point cloud data 302 may be expressed as a series of line segments between the points in the second set of data points 304(2).

Figure 4:
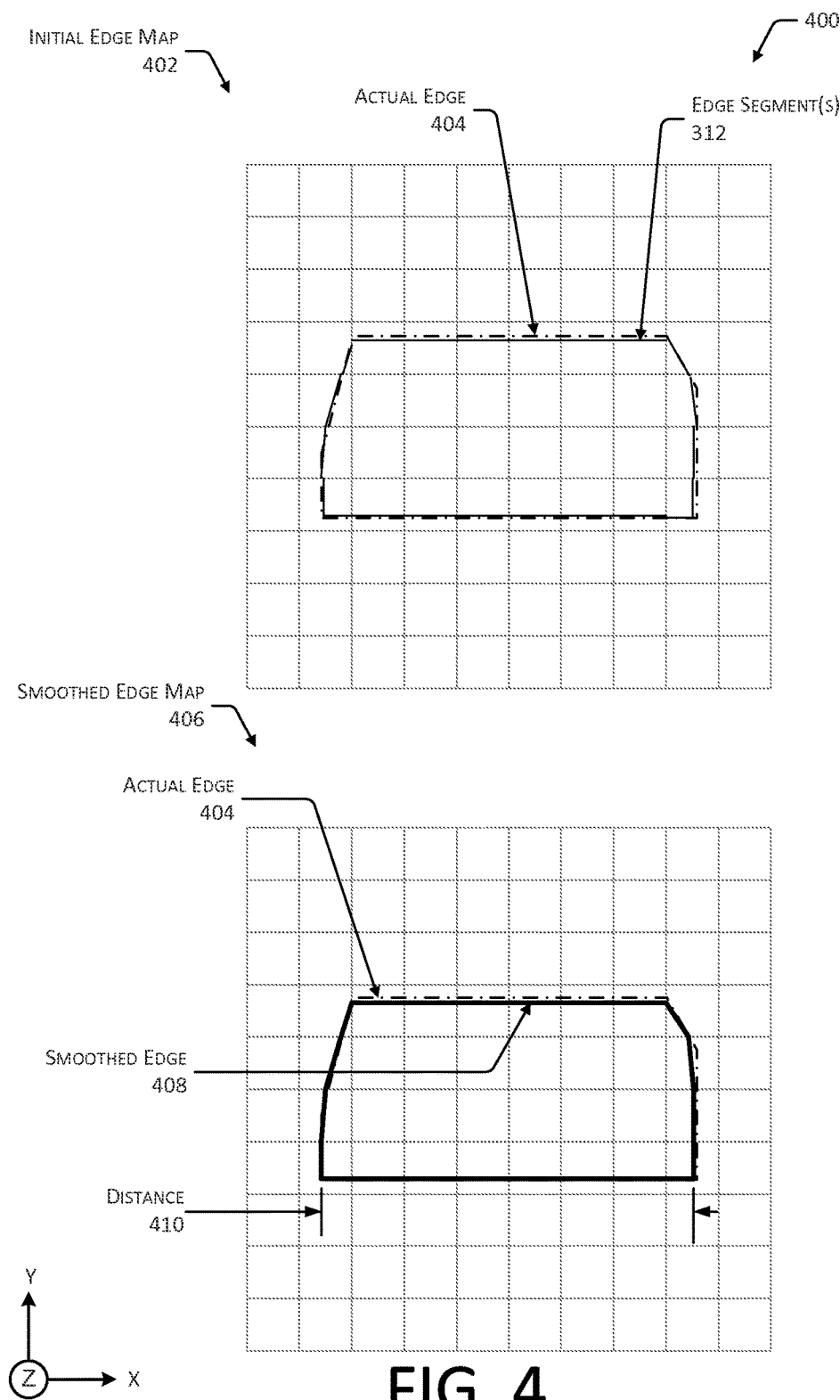
FIG. 4 illustrates an initial edge map comprising a plurality of characterized edge segments, and a smoothed edge map based on the initial edge map.

FIG. 4 illustrates processing 400 of the edge map 118. As described above, the bins 114 may have associated edge data 116. The edge data 116 may comprise edge segments defined as references to the edge characterization data 202 or as line segments described as linked lists, and so forth.

In this illustration an initial edge map 402 is depicted. An actual edge 404 of the actual object 108 is shown as a broken line, while the edge segments 312 from the plurality of bins 114 in the bin array are shown as solid line segments. For this illustration, the edge characterization data 202 may have been used to generate the edge segments 312. Because the edge shapes 206 and edge coordinates 208 available in the edge characterization data 202 may not exactly match the actual edge 404, some variation may result. Said another way, the edge segment 312 for a particular bin 114 may be close, but not necessarily identical to, the actual edge 404 present in that bin 114. As described above, in other implementations the edge data 116 may use a series of line segments describing an edge 306 in the boundary 308 between the first set of data points 304(1) and the second set of data points 304(2). Due to slight variations in position, edge detection, and so forth between bins 114, the edge segment 312 in one bin 114 may be discontinuous with the edge segment 312 in an adjacent bin 114.

A smoothed edge map 406 may be formed by using a function to smooth or join these adjacent edge segments 312 and form a continuous smoothed edge 408. As described above, the smoothed edge 408 may be almost, but not quite, identical to the actual edge 404.

Once the smoothed edge 408 is available in the edge map 118, the measurement module 124 may be configured to determine one or more measurements of the actual object 108 using the edge map 118. For example, a distance 410 between the lower left and lower right corners of the actual object 108 depicted here may be determined. Compared to the coarseness of the bins 114 in the bin array, the smoothed edge 408 provided in the smoothed edge map 406 is significantly more detailed and provides a much more accurate physical measurement than a corresponding measurement using only the depth map 120. As a result, spatial information about the edge 306 is retained. Furthermore, this processing by the measurement module 124 may take place without accessing or otherwise processing the 3D data 110. As a result, the overall speed and responsiveness in the user device 102 making the measurements is improved. Distances may be determined between a first point on a first edge and a second point on a second edge of the edge map 118. For example, points on the initial edge map 402 or the smoothed edge map 406 may be used to determine a distance 410.

Figure 5:
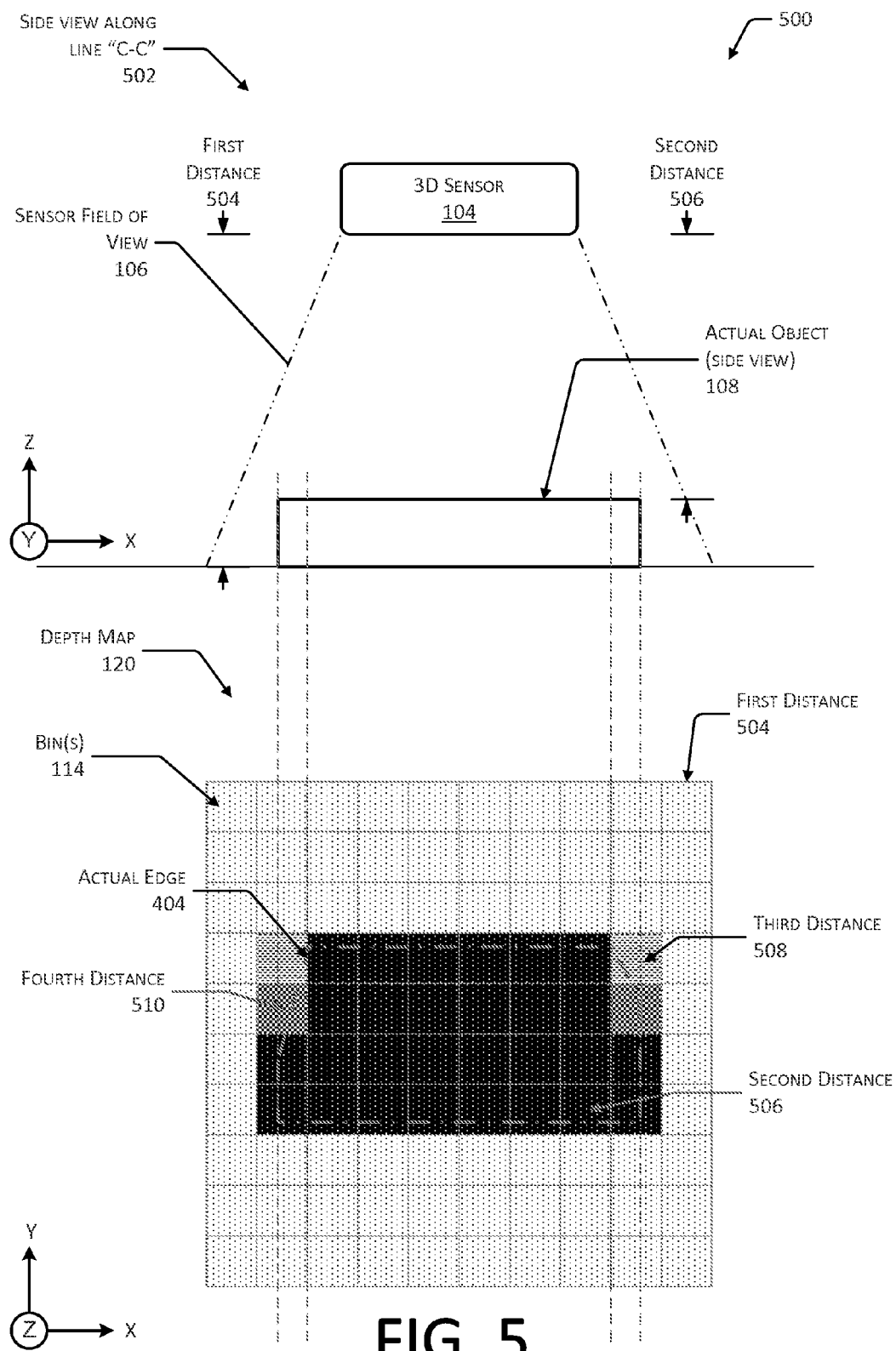
FIG. 5 illustrates a depth map which may be generated based on data points in the bins.

FIG. 5 illustrates a scenario 500 in which the depth map 120 is generated based on data points 304 in the bins 114. In this illustration, a side view along line "C-C" 502 the 3D sensor 104 is shown along with a profile of the actual object 108. A first distance 504 is depicted extending from the 3D sensor 104 to the surface upon which the actual object 108 is resting. A second distance 506 is depicted extending from the 3D sensor 104 to an uppermost surface of the actual object 108.

Depicted below the side view 502 is the corresponding depth map 120, as generated by the 3D sensor 104 viewing the actual object 108 from overhead. The depth map 120 comprises a plurality of pixels. In some implementations each of the bins 114 may comprise a pixel. Shown for comparison purposes is the actual edge 404 of the actual object 108. In this illustration, different shades or patterns in the depth map 120 correspond to different distances. For example, the first distance 504 is represented with light shading, while the second distance 506 is depicted with dark shading. As described above, a bin value may be used to determine the value of the pixels or bins 114 as represented in the depth map 120. In one implementation, the distances for the data points within the bin 114 may be averaged to determine the bin value. This bin value may then be used to build the depth map 120. Due to the binning process and the spatial coarseness of the bins 114, information about the size and shape of the actual object 108 may be lost or degraded. In this illustration due to the placement of the edges within the bins 114, bin values for some bins 114 may be determined to be between the first distance 504 and the second distance 506. For example, some bins 114 have are depicted as having a third distance 508 or a fourth distance 510, implying a slope or feature which does not exist on the actual object 108.

As described above, the classifier module 122 may apply one or more filters, functions, or operations to the depth map 120. For example, 2D image filters may be applied, objects may be identified, and so forth. Due to the binning process, the depth map 120 may be coarser or have a lower spatial resolution when compared to the edge map 118. The classifier module 122, the measurement module 124, or both may use the edge map 118 and the depth map 120 to gain information about the actual object 108.

Figure 6:
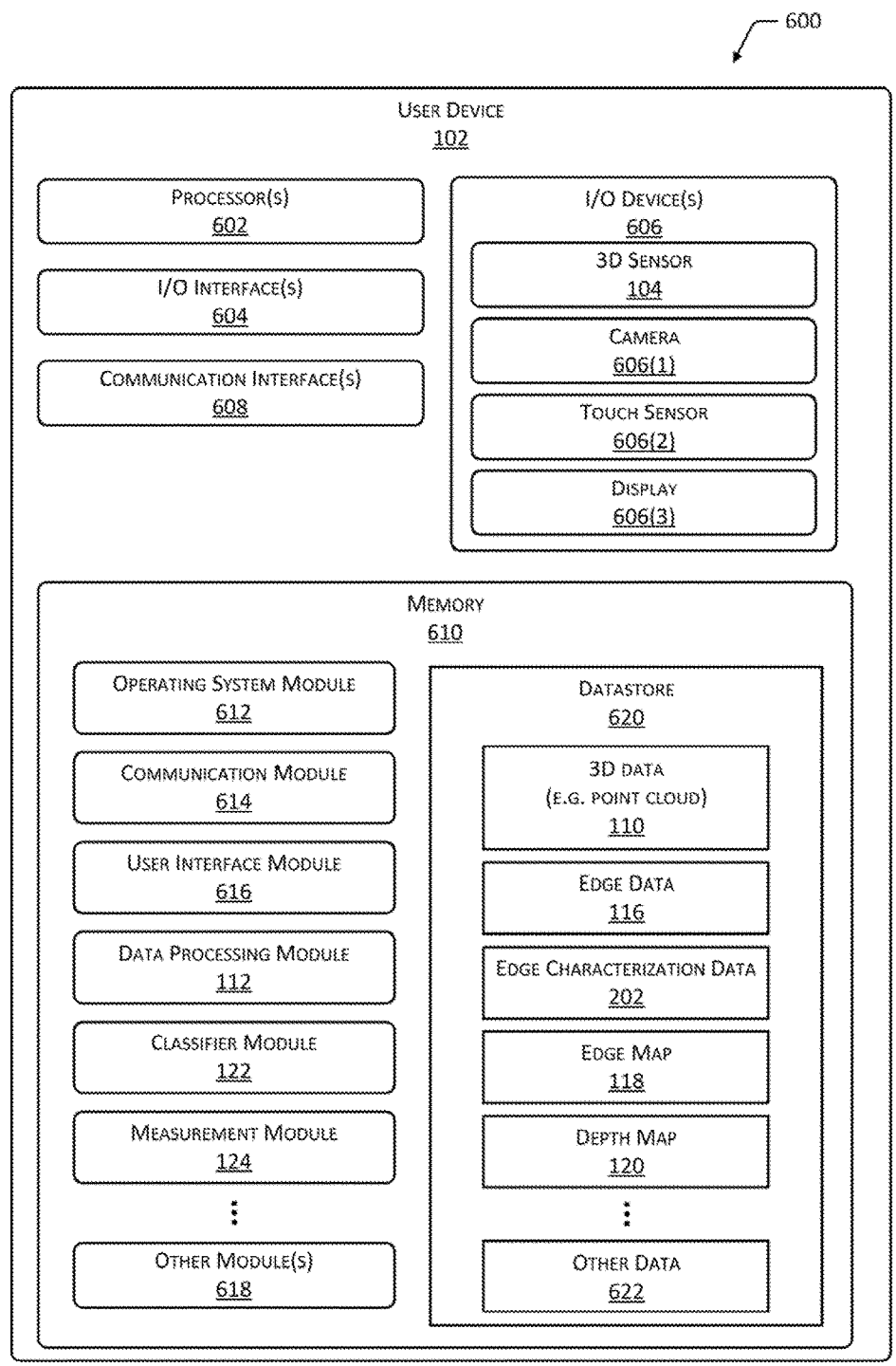
FIG. 6 illustrates a block diagram of a user device which may be configured to acquire 3D data from a 3D sensor and generate an edge map, depth map, or both.

FIG. 6 illustrates a block diagram 600 of the user device 102 which may be configured to acquire the 3D data 110 from the 3D sensor 104 and generate the edge map 118, the depth map 120, or both. The user device 102 may include one or more processors 602 configured to execute one or more stored instructions. The processors 602 may comprise one or more cores. The user device 102 may include one or more input/output ("I/O") interface(s) 604 to allow the processor 602 or other portions of the user device 102 to communicate with other devices. The I/O interfaces 604 may comprise inter-integrated circuit ("I2C"), serial peripheral interface bus ("SPI"), Universal Serial Bus ("USB") as promulgated by the USB Implementers Forum, RS-232, one or more device interfaces such as High Definition Multimedia Interface ("HDMI") as promulgated by HDMI Licensing LLC, TOSLINK as promulgated by Toshiba Corp., IEEE 1394 as promulgated by the IEEE, and so forth.

The I/O interface(s) 604 may couple to one or more I/O devices 606. The I/O devices 606 may include input devices such as the 3D sensor 104, a camera 606(1), a touch sensor 606(2), a microphone, a button, and so forth. The I/O devices 606 may also include output devices such as a display 606(3), audio speakers, haptic output devices, and so forth. The display 606(3) may comprise an electrophoretic display, projector, liquid crystal display, interferometric display, light emitting diode display, and so forth. In some embodiments, the I/O devices 606 may be physically incorporated with the user device 102 or may be externally placed.

The user device 102 may also include one or more communication interfaces 608. The communication interfaces 608 are configured to provide communications between the user device 102, other devices, servers, routers, access points, servers, and so forth. The communication interfaces 608 may include devices configured to couple to one or more networks including personal area networks ("PANs"), local area networks ("LANs"), wireless local area networks ("WLANs"), wireless wide area networks ("WWANs), and so forth.

The user device 102 may also include one or more busses or other internal communications hardware or software that allow for the transfer of data between the various modules and components of the user device 102.

As shown in FIG. 6, the user device 102 includes one or more memories 610. The memory 610 comprises one or more computer-readable storage media ("CRSM"). The CRSM may be any one or more of an electronic storage medium, a magnetic storage medium, an optical storage medium, a quantum storage medium, a mechanical computer storage medium and so forth. The memory 610 provides storage of computer readable instructions, data structures, program modules and other data for the operation of the user device 102.

The memory 610 may include at least one operating system ("OS") module 612. The OS module 612 is configured to manage hardware resource devices such as the I/O interfaces 604, the I/O devices 606, the communication interfaces 608, and provide various services to applications or modules executing on the processors 602. Also stored in the memory 610 may be one or more of the following modules. These modules may be executed as foreground applications, background tasks, daemons, and so forth.

A communication module 614 is configured to support communication with the servers or other devices using one or more networks. The communication module 614 may be configured to encrypt or otherwise protect the data transferred between the other devices. For example, hypertext transport protocol secured ("HTTPS") or transport layer security ("TLS") may be supported. The communication module 614 may also be configured to facilitate transfer of the 3D data 110, the edge data 116, the edge map 118, the depth map 120, and so forth from the user device 102 to another device such as a server.

A user interface module 616 is configured to provide a user interface to the user. This user interface may comprise one or more of a graphical user interface, an audible user interface, or a haptic user interface. The user interface module 616 is configured to process inputs and provides corresponding outputs to the user. For example, the inputs may be received by the touch sensor 606(2) and the outputs may include presentation using the display 606(3), using audio speakers, and so forth. For example, the user interface module 616 may interpret a touch on a particular area of the touch sensor 606(2) as being an activation of the 3D sensor 104 to acquire 3D data 110 of the actual object 108 in the sensor field of view 106.

As described above, the data processing module 112 is configured to process at least a portion of the 3D data 110. For example, the data processing module 112 may be configured to arrange the data points into the plurality of bins 114 in the bin array. The data processing module 112 may also be configured to generate the edge data 116 for the bins 114. Based on the edge data 116 the data processing module 112 may generate the edge map 118. Likewise, based on bin values, the depth map 120 may be generated.

The classifier module 122 may be used to process the edge map 118, the depth map 120, or both using one or more filters or other functions. For example, the classifier module 122 may be configured to use object recognition to determine the presence and identity of a particular actual object 108. As described above, because the edge map 118 and the depth map 120 comprise 2D arrays, they may be processed using fewer computational resources than equivalent processing of the 3D data 110.

The memory 610 may also store the measurement module 124. The measurement module 124 is configured to use the edge map 118, the depth map 120, or a combination thereof, to determine distances between two or more points, length of at least a portion of an edge 306 of the actual object 108, and so forth. As described above, the measurement module 124 is able to make these measurements without accessing the 3D data 110. In some implementations the measurement module 124 may receive requests for particular measurements and respond to those requests with measurement data.

In some implementations the classifier module 122 and the measurement module 124 may operate in conjunction with one another. For example, the classifier module 122 may identify the actual object 108 while the measurement module 124 provides measurements or scaling information of the actual object 108.

Other modules 618 may also be present. For example, application modules may be present to provide eBook readers, browsers, calculators, word processors, spreadsheets, slideshow presenters, drawing programs, and so forth.

The memory 610 may also include a datastore 620 to store information. The datastore 620 may use a flat file, database, linked list, tree, executable code, or other data structure to store the information. In some implementations, the datastore 620 or a portion of the datastore 620 may be distributed across one or more other devices including servers, network attached storage devices and so forth.

As depicted here, the datastore 620 may store one or more of the 3D data 110, the edge data 116, the edge characterization data 202, the edge map 118, or the depth map 120. Other data 622 may also be stored. For example, the other data 622 may include user preferences, configuration files, and so forth.

Illustrative Processes

Figure 7:
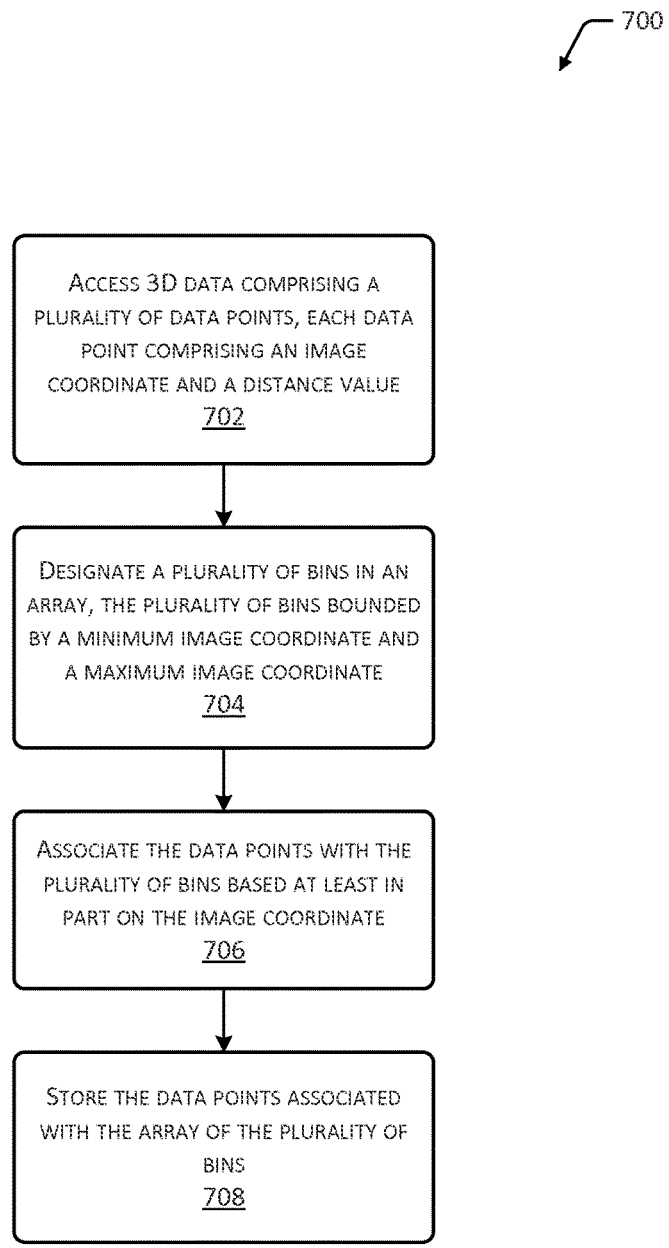
FIG. 7 is a flow diagram of a process of binning data points into an array of bins.

FIG. 7 is a flow diagram 700 of a process of binning data points into an array of bins 114. The user device 102 or other devices such as a server may implement the process 700, at least in part.

Block 702 accesses the 3D data 110. The 3D data 110 may comprise an unordered point cloud having a plurality of data points. The data points may comprise one or more image coordinates and a distance or depth value. For example, the data points may comprise (X,Y,Z) where X and Y indicate a position in the sensor field of view 106 of the 3D sensor 104, while the Z value comprises a distance between the actual object 108 and the 3D sensor 104.

Block 704 designates a plurality of bins 114 in an array, the plurality of bins bounded by a minimum image coordinate and a maximum image coordinate in the 3D data 110. For example, the minimum image coordinate may correspond to an origin point or pixel (0,0) at a corner of an image detector of the 3D sensor 104, while the maximum image coordinate comprises an opposite corner, such as (1024× 1024). In some implementations a single bin 114 may be associated with a single pixel or coordinate location. In other implementations a single bin 114 may encompass more than one pixel. When the minimum image coordinate and the maximum image coordinate are not previously determined, such as where the bounds of the 3D data 110 are not previously known, a search for minima and maxima may be run against the 3D data 110.

Block 706 associates the data points into the plurality of bins 114 based at least in part on the image coordinate. For example, several data points may have been acquired for the bin 114 at coordinates (123, 456). These data points may be moved or associated with that bin 114. The data points in the bins 114 may or may not be sorted.

In one implementation, the placement of the data points into the bins 114 may be visualized as occurring with a search starting with a bin 114 located in a corner of the bin array. Data points which have image coordinates falling within the same bin 114 are placed in that bin 114. The process may proceed for bins 114 along an arc centered on the corner or other origin point.

In another implementation, the associating may involve determining a relative distance between a defined origin point and the plurality of data points. Based at least in part on a relative distance between the origin and the image coordinate, data points may be placed within the corresponding bin 114. For example, the binning occurs from the origin and spreads out along an expanding front.

Block 708 stores the data points associated with the array of the plurality of bins. In one implementation, the association between the data points and the bin in the array may be stored. In another implementation the data points may be stored or written into the bins 114.

Figure 8:
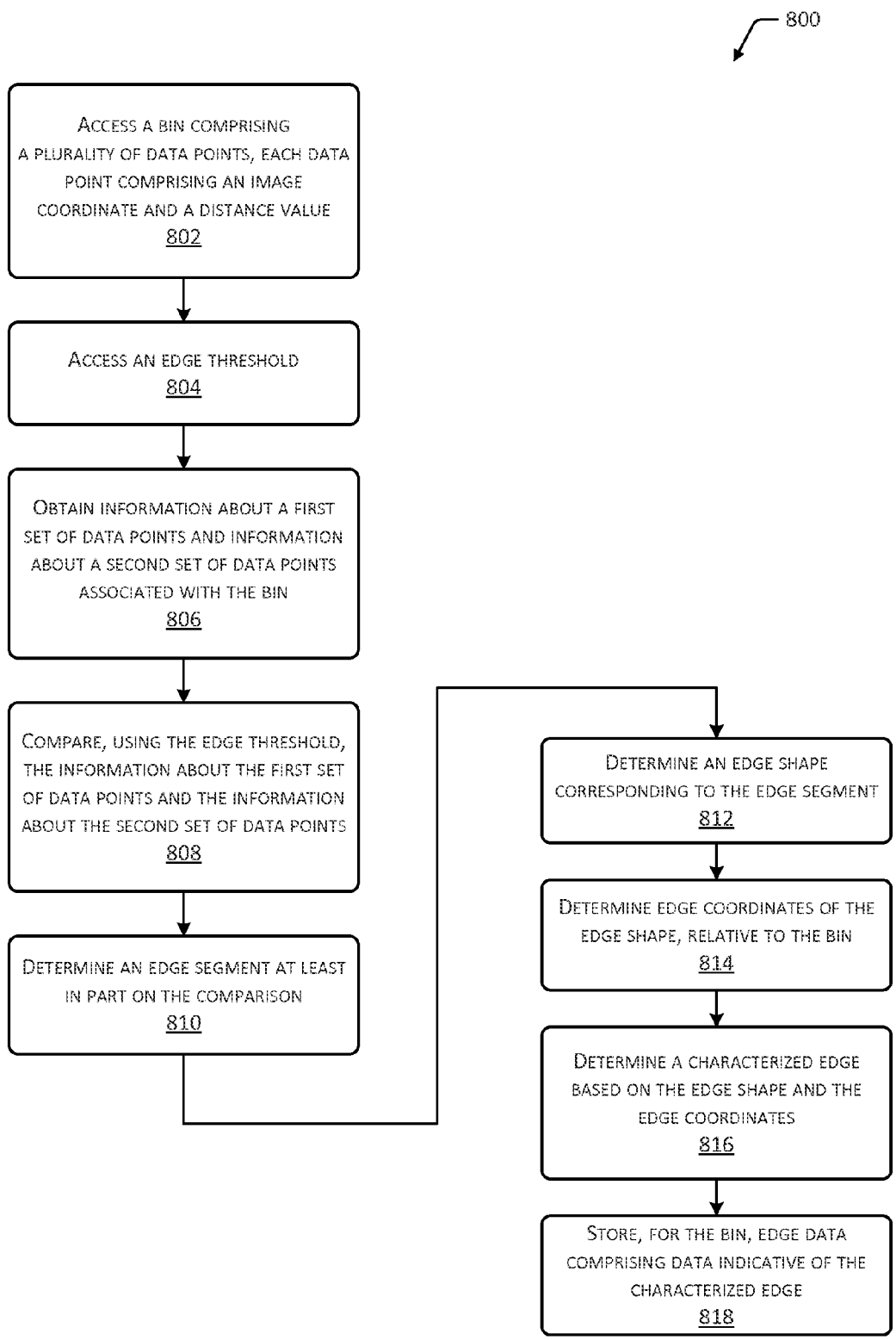
FIG. 8 is a flow diagram of a process for generating edge data which characterizes edges within the bins of the array of bins.

FIG. 8 is a flow diagram 800 of a process for generating the edge data 116 which characterizes edges 306 within the bins 114 of the array of bins using edge characterization data 202. The user device 102 or other devices such as a server may implement the process 800, at least in part.

Block 802 accesses a bin 114 comprising one or more data points. As described above, the data point may comprise an image coordinate and a distance or depth value. The data points may be sorted into the bins 114 based on the image coordinate, relative position of the data point in space, distance to a predetermined point such as an origin, and so forth.

Block 804 accesses an edge threshold. The edge threshold comprises a designation of one or more conditions which are used to determine a presence of an edge. For example, the edge threshold may designate an edge when two points described by two data points within 0.5 millimeters of one another in the X,Y plane and exhibit a difference along the Z axis of greater than 2 millimeters. In another example, the edge threshold may specify a change in Z distance of more than 50% between adjacent data points is required to designate an edge. The edge threshold may be static or dynamically adjustable. For example, the edge threshold may be stored in memory and retrieved.

Block 806 obtains information about a first set of data points 304(1) and information about a second set 304(2) of data points. Each data point of the first set 304(1) and each data point of the second set 304(2) may be associated with or within the same bin 114. In some implementations, the obtaining may include accessing the 3D data 110 stored in memory 610.

Block 808 compares the first set 304(1) of one or more data points with the second set 304(2) of one or more data points. This comparison may be based at least in part on the edge threshold. In some implementations the sets may be small, such as when a single data point is compared with another data point. The sets may also contain different quantities of data points. For example, the first set 304(1) may include three data points while the second set 304(2) may include one data point. Instead of, or in addition to the comparison, in some implementations other edge detection techniques may be applied. In some implementations, the comparison may involve additional sets, such as a third set, fourth set, and so on.

Block 810, based at least in part on the comparison, determines a presence of one or more edge segments 312 at the boundary 308 between the first set 304(1) and the second set 304(2). As described above, in some implementations the bin 114 may include multiple edges 306. In some implementations, the block may iteratively processes all of the data points in the bin 114. Edges 306 which are detected, such as those which exceed the edge threshold may be retained.

Block 812 determines an edge shape 206 corresponding to the edge segment 312. For example, the edge segment 312 may be compared with the edge shapes 206 in the edge characterization data 202 to determine a closest match.

Block 814 determines edge coordinates of the edge shape 206, relative to the bin 114. For example, the edge center 314 may be determined for the edge segment 312. The location of the edge center 314 may be used to determine placement within a bounded area defined by the sub-bin coordinates 316. In some implementations, placement may use real-world coordinates, such as millimeters relative to an origin. For example, the edge center 314 may be defined at a particular set of real-world (X,Y) coordinates.

Block 816 determines the characterized edge 310 based on the edge shape 206 and the edge coordinates 208. For example, the characterized edge 310 may be associated with the edge identifier 204(5) because the edge shape 206 is a slanted line with an edge center 314 located at the sub-bin coordinates 316 of (1,1).

Block 818 stores the edge data 116 comprising data indicative of the characterized edge 312 in or with the bin 114. For example, the edge identifier 204(5) may be stored such that the index value "204(5)" is associated with the particular bin 114.

In some implementations, at least some of the operations of blocks 806 through 818 may be iterated across the plurality of bins 114. For example, information about a first bin 114(1) may be obtained and processed to determine edge data 116 for the first bin 114(1), while information about a second bin 114(2) may be obtained and processed to determine edge data 116 for the second bin 114(2), and so forth.

Figure 9:
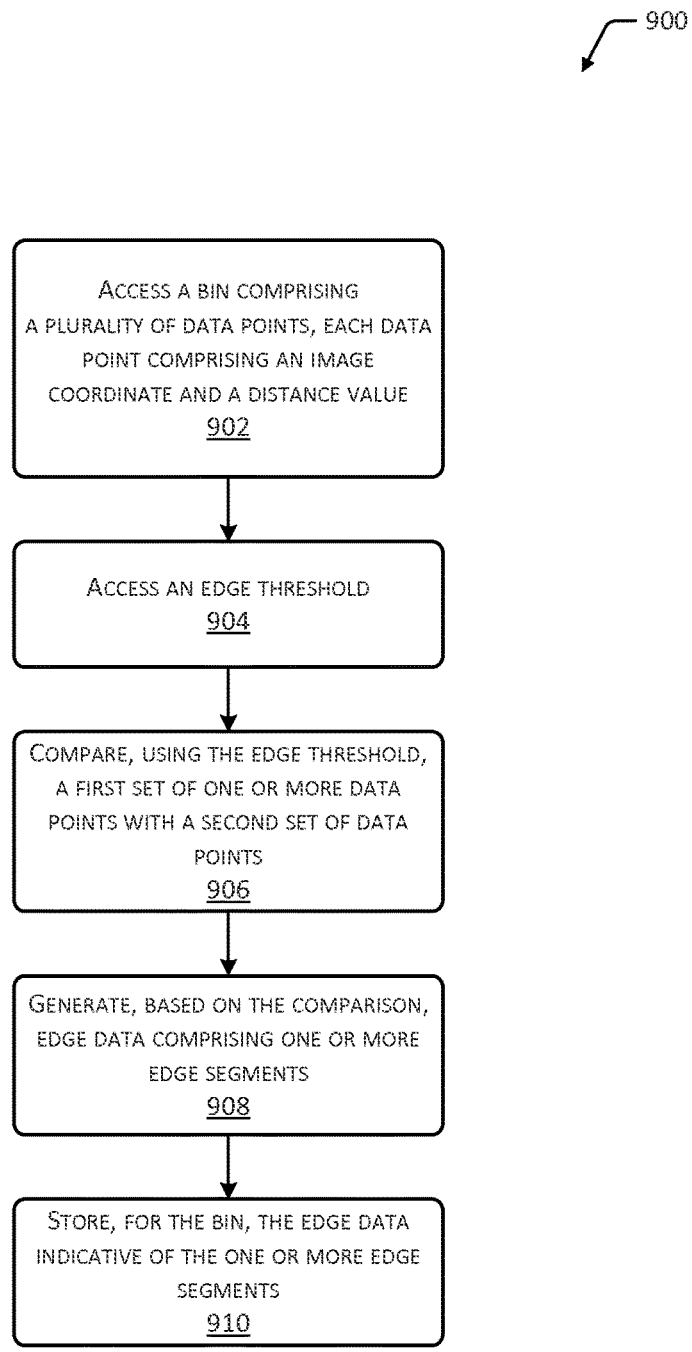
FIG. 9 is a flow diagram of another process for generating edge data within the bins of the array of bins.

FIG. 9 is a flow diagram 900 of another process for generating edge data 116 within the bins 114 of the array of bins 114. The user device 102 or other devices such as a server may implement the process 900, at least in part. While the process 800 may store information which indicates the characterized edge 310 by reference to edge characterization data 202, in this process, information about the particular edge segment 312 may be stored, such as a vector value, linked list, and so forth.

Block 902 accesses a bin 114 comprising one or more data points. As described above, the data point may comprise an image coordinate and a distance or depth value. The data points may be sorted into the bins 114 based on the image coordinate, relative position, distance to a predetermined point such as an origin, and so forth.

Block 904 accesses an edge threshold. The edge threshold comprises a designation of one or more conditions which are used to determine a presence of an edge 306. For example, the edge threshold may specify a predetermined value for a variance in distance/depth of two or more points. The edge threshold may be static or dynamically adjustable.

Block 906 compares a first set 304(1) of one or more data points with a second set 304(2) of one or more data points. This comparison may be based at least in part on the edge threshold. In some implementations the sets may be small, such as when a single data point is compared with another data point. The sets may also contain different quantities of data points. For example, the first set 304(1) may include three data points while the second set 304(2) may include one data point. Instead of, or in addition to comparison, in some implementations other edge detection techniques may be applied. As described above, this comparison may involve more than two sets of one or more data points.

Block 908 generates, based on the comparison, one or more edge segments 312. The edge segments 312 may further comprise one or more line segments. For example, an edge 306 which curves may be represented as a series of line segments which approximate the curvature. In another implementation the edge segments 312 may comprise an expression, such as a function or formula. For example, the curved edge may be described using a formula for an arc, given a radius of curvature of the arc.

Block 910 stores in or with the bin 114 the edge data 116 indicative of the edge segment 312. For example, the data may be stored as a linked list of points between which line segments are drawn.

Figure 10:
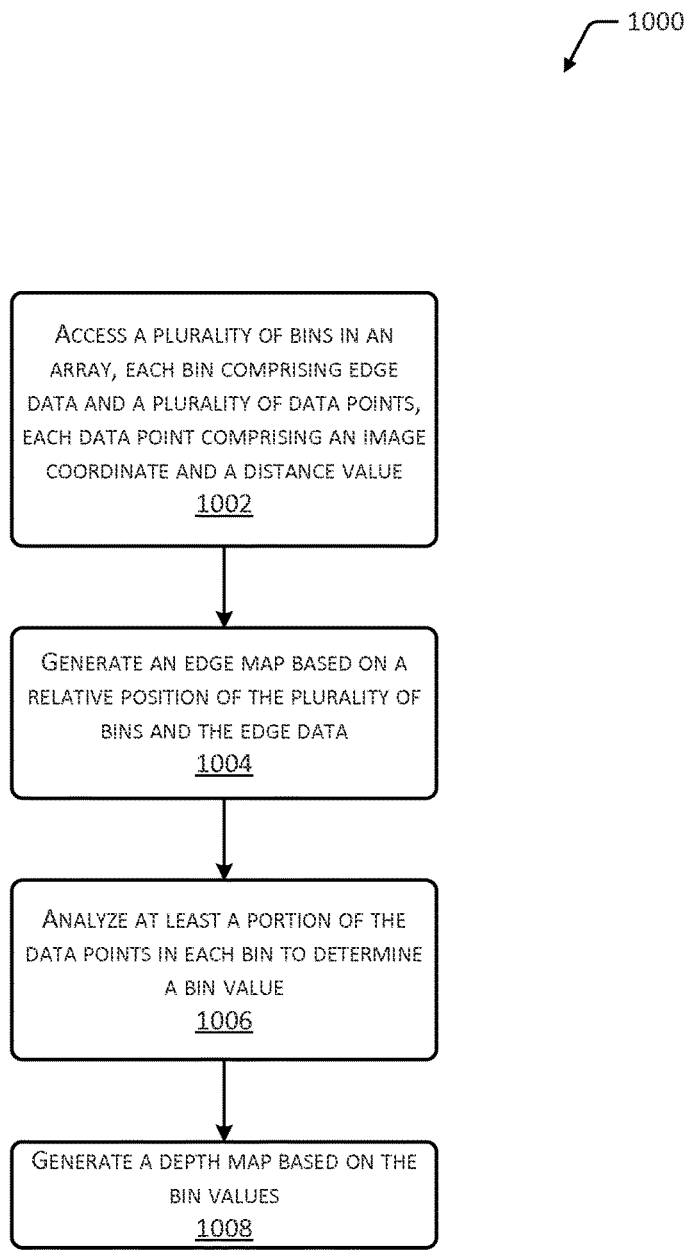
FIG. 10 is a flow diagram of a process of generating an edge map based on the position of the plurality of the bins in the bin array and the edge data, and a depth map based on bin values for the plurality of the bins in the bin array.

FIG. 10 is a flow diagram 1000 of a process of generating the edge map 118 based on the position of the plurality of the bins 114 in the bin array and the edge data 116. The depth map 120 may also be based on bin values for the plurality of the bins 114 in the bin array. The user device 102 or other devices such as a server may implement the process 1000, at least in part.

Block 1002 accesses the plurality of bins 114 in the bin array. As described above, each bin 114 may comprise edge data 116 and a plurality of data points. The data point may comprise an image coordinate and a distance or depth value. For example, the bin array described in FIG. 9 and stored in the memory 610 may be accessed by the data processing module 112.

Block 1004 generates the edge map 118 based on the relative position of the plurality of bins 114 and the edge data 116. For example, the position of one bin 114 next to another bin 114 within the array is known. The data processing module 112 may access these bins 114 and the edge data 116 to generate a contiguous edge based on the information about the edges within the bins 114. The edge map 118 may then be stored, such as in the memory 610, transferred at least in part to another device, and so forth.

Block 1006 analyzes at least a portion of the data points in each bin 114 to determine a bin value. In some implementations the bin value may be an average, median, mode, or other result from a function applied to at least a portion of the data points. For example, the bin value may be an average of the distance values of the data points in the bin 114.

Block 1008 generates the depth map 120 based on the bin values. As described above, in some implementations the pixels of the depth map 120 may correspond to one or more of the bins 114. For example, a single bin 114 may correspond to a single pixel. A value may be assigned to the pixel in the depth map 120 based on the bin value. For example, the "color" of the pixel may be based on the bin value, such that darker shades indicate points or pixels which are closer to the 3D sensor 104 while lighter shades indicate points or pixels which are farther away from the 3D sensor 104.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system comprising:
   a memory storing computer-executable instructions; and
   at least one processor configured to couple to a three-dimensional sensor device, access the memory, and execute the computer-executable instructions to:
   access three-dimensional ("3D") data comprising a plurality of data points, each data point of the plurality of data points comprising a two-dimensional ("2D") image coordinate and a distance value;

associate each data point of the plurality of data points, using the 2D image coordinate, with at least one bin of a plurality of non-overlapping bins, the plurality of non-overlapping bins forming a bin array of data points comprising the 2D image coordinate and the distance value for each data point;

determine an edge threshold including a designation of one or more conditions used to determine a presence of an edge; and for the bin of the plurality of non-overlapping bins:
  obtain information about a first set of data points and information about a second set of data points, wherein each data point of the first set and each data point of the second set was associated with the bin of the plurality of non-overlapping bins;
  compare, using the edge threshold, the information about the first set of data points with the information about the second set of data points;
  determine, based at least in part on the comparison, edge segments from edge data, the edge segments indicative of a characterized edge associated with data points having the distance value exceeding the edge threshold by a predetermined amount;
  store the edge segments from the edge data, the edge segments indicative of the characterized edge in an edge characterization data table, the edge data including an edge identifier referring to an edge shape and an edge position within the bin; and
  generate an edge map using the characterized edge by applying a smoothing function to the edge data to join the edge segments in the plurality of non-overlapping bins to form a continuous edge across the plurality of non-overlapping bins based on the relative position of the plurality of non-overlapping bins in the bin array and the edge data.

2. The system of claim 1, the computer-executable instructions further configured to generate the edge map by:
  accessing a plurality of characterized edges; and
  generating a smoothed edge based at least in part on the plurality of characterized edges.

3. The system of claim 1, wherein the plurality of data points are unordered.

4. The system of claim 1, the computer-executable instructions further configured to:
  determine a depth value for the bin using a portion of the plurality of data points; and
  generate a pixelated depth map using the depth value for the bin.

5. A computer-implemented method comprising:
  accessing three-dimensional ("3D") data comprising a plurality of data points, each data point comprising a two-dimensional ("2D") image coordinate and a distance value;
  associating, based at least in part on the 2D image coordinate, each data point of the plurality of data points with at least one bin of a plurality of non-overlapping bins forming a bin array of data points comprising the 2D image coordinate and the distance value for each data point;
  comparing an edge threshold to the distance value for each data point of the plurality of data points in each of the plurality of non-overlapping bins to identify an edge in each of the plurality of non-overlapping bins associated with data points having a distance value exceeding the edge threshold by a predetermined amount;
  based at least in part on the comparison, determining, from the identified edge, edge data representing edge segments, the edge segments indicative of a characterized edge in an edge characterization data table for each of the plurality of non-overlapping bins;
  storing the edge data representing the edge segments in each of the plurality of non-overlapping bins indicative of the characterized edge in the edge characterization data table, the edge data including an edge identifier referring to an edge shape and an edge position; and
  generating an edge map using the edge data by applying a smoothing function to the edge data to join the edge segments in each of the plurality of non-overlapping bins to form a continuous edge across the plurality of non-overlapping bins based on a relative position of the plurality of non-overlapping bins in the bin array of data points and the edge data.

6. The computer-implemented method of claim 5, wherein the generating the edge map is based on a position of the plurality of non-overlapping bins.

7. The computer-implemented method of claim 5, wherein the generating the edge map is based on a real-world position indicated by the data points in the plurality of non-overlapping bins.

8. The computer-implemented method of claim 5, further comprising:
  generating the 3D data using one or more of:
    an optical time-of-flight sensor,
    a structured light sensor,
    a stereovision sensor,
    an interferometer, or
    a coded aperture camera.

9. The computer-implemented method of claim 5, further comprising:
  processing the edge map with a classifier to identify one or more objects.

10. The computer-implemented method of claim 5, the determining the edge data representing the edge segments for each of the plurality of non-overlapping bins comprising:
  obtaining information about a first set of data points and information about a second set of data points, wherein each data point of the first set and each data point of the second set is associated with one of the plurality of non-overlapping bins;
  comparing, using the edge threshold, the information about the first set of data points with the information about the second set of data points;
  determining, based at least in part on the comparison, the edge segments indicative of the characterized edge associated with the data points having the distance value exceeding the edge threshold by the predetermined amount;
  determining an edge shape corresponding to the edge segments by comparing the determined edge segments with the edge shapes in the edge characterization data table;
  determining edge coordinates of the edge shapes, relative to the one of the plurality of non-overlapping bins including an edge center used to determine placement within a bounded area defined by sub-bin coordinates; and
  determining the characterized edge based on the edge shape and the edge coordinates.

11. The computer-implemented method of claim 5, further comprising:
  determining a distance between a first point on a first edge and a second point on a second edge; and
  storing the distance.

12. The computer-implemented method of claim 5, further comprising:
  analyzing at least a portion of the data points in one of the bins to determine an average bin depth; and
  generate a depth map wherein each pixel corresponds to a bin, and a depth value of each pixel is based on the average bin depth.

13. The computer-implemented method of claim 12, wherein the edge data is specified to a position within the bin, such that the edge map comprises data at a resolution greater than the depth map.

14. A non-transitory computer readable medium storing instructions, which when executed by a processor, cause the processor to perform actions comprising:
  accessing a plurality of data points comprising a two-dimensional ("2D") image coordinate and a distance value associated with a three-dimensional object, wherein each data point of the plurality of data points is associated with at least one bin of a plurality of non-overlapping bins forming a bin array of data points comprising the 2D image coordinate and the distance value for each data point;
  comparing an edge threshold to the distance value for each data point of the plurality of data points in each of the plurality of non-overlapping bins to identify an first edge in a first bin of the plurality of non-overlapping bins and a second edge in a second bin of the plurality of non-overlapping bins associated with data points having a distance value exceeding the edge threshold by a predetermined amount;
  based at least in part on the comparison, determining, from the first identified edge, first edge data representing a first edge segment, the first edge segment indicative of a first characterized edge in an edge characterization data table for the first bin of the plurality of non-overlapping bins;
  based at least in part on the comparison, determining, from the first identified edge, first edge data representing a second edge segment, the second edge segment indicative of a second characterized edge in the edge characterization data table for the second bin of the plurality of non-overlapping bins; and
  storing the first edge segment and the second edge segment indicative of the first and the second characterized edges in the edge characterization data table, the first edge segment indicative of the first characterized edge in the edge characterization data table including a first edge identifier referring to a first edge shape and a first edge position and the second edge segment indicative of the second characterized edge in the edge characterization data table including a second edge identifier referring to a second edge shape and a second edge position.

15. The non-transitory computer-readable medium of claim 14, further comprising:
  generating an edge map based on a relative position of the plurality of non-overlapping bins in the bin array and the stored first edge segment and the second edge segment.

16. The non-transitory computer-readable medium of claim 15, further comprising:
  applying one or more filter functions to the edge map.

17. The non-transitory computer-readable medium of claim 15, further comprising:
  determining a distance between a first point on the first edge of the edge map and a second point on the second edge of the edge map; and
  storing the distance.

18. The non-transitory computer-readable medium of claim 14, the determining the edge data representing the first edge segment and the second edge segments from the edge data for one or more of the plurality of non-overlapping bins in the bin array comprising:
  obtaining information about a first set of data points and information about a second set of data points, wherein each data point of the first set and each data point of the second set is associated with one of the plurality of non-overlapping bins;
  comparing, using the edge threshold, the information about the first set of data points with the information about the second set of data points;
  determining, based at least in part on the comparison, the edge segments;
  determining the edge shapes corresponding to the first edge segment and the second edge segment by comparing the determined first and second edge segments with edge shapes in the edge characterization data table;
  determining edge coordinates of the edge shapes, relative to the one of the plurality of non-overlapping bins including an edge center used to determine placement within a bounded area defined by sub-bin coordinates; and
  determining the first characterized edge and the second characterized edge based on the edge shapes and the edge coordinates.

19. The non-transitory computer-readable medium of claim 18, the determining the edge data representing the first and the second edge segments from the edge data for the one of the plurality of non-overlapping bins in the bin array further comprising:
  determining edge coordinates of the edge shape, relative to one of the plurality of non-overlapping bins; and
  wherein the determining the characterized edge is further based on the edge coordinates.

20. The non-transitory computer-readable medium of claim 14, the determining the edge data representing the first and the second edge segments from the edge data for one of the plurality of non-overlapping bins in the bin array comprising:
  obtaining information about the first set of data points and information about the second set of data points, wherein each data point of the first set and each data point of the second set is associated with one of the bins;
  comparing the information about the first set of data points with the information about the second set of data points;
  determining an edge segment based at least in part on the comparison; and
  storing edge data comprising data indicative of the edge segments.

* * * * *